(12) United States Patent
Uttamchandani et al.

(10) Patent No.: US 8,949,531 B2
(45) Date of Patent: Feb. 3, 2015

(54) AUTOMATED SPACE MANAGEMENT FOR SERVER FLASH CACHE

(71) Applicant: VMware, Inc., Palo Alto, CA (US)

(72) Inventors: Sandeep Uttamchandani, Cupertino, CA (US); Li Zhou, Campbell, CA (US); Fei Meng, Raleigh, NC (US); Deng Liu, Mountain View, CA (US)

(73) Assignee: VMware, Inc., Palo Alto, CA (US)

( * ) Notice: Subject to any disclaimer, the term of this patent is extended or adjusted under 35 U.S.C. 154(b) by 191 days.

(21) Appl. No.: 13/693,976

(22) Filed: Dec. 4, 2012

(65) Prior Publication Data

US 2014/0156910 A1    Jun. 5, 2014

(51) Int. Cl.
*G06F 12/02* (2006.01)
*G06F 12/08* (2006.01)
*G06F 9/50* (2006.01)

(52) U.S. Cl.
CPC .......... *G06F 12/0873* (2013.01); *G06F 9/5016* (2013.01); *G06F 12/0246* (2013.01); *G06F 2212/152* (2013.01); *G06F 2212/222* (2013.01); *G06F 2212/6042* (2013.01)
USPC ......................................... 711/118; 711/103

(58) Field of Classification Search
None
See application file for complete search history.

(56) References Cited

U.S. PATENT DOCUMENTS

| | | | |
|---|---|---|---|
| 7,373,480 B2 * | 5/2008 | Cypher | 711/216 |
| 8,688,909 B2 * | 4/2014 | Ishizaki et al. | 711/114 |
| 8,706,962 B2 * | 4/2014 | Belluomini et al. | 711/117 |
| 8,769,202 B1 * | 7/2014 | Soundararajan et al. | 711/118 |
| 2008/0071987 A1 * | 3/2008 | Karn et al. | 711/118 |
| 2012/0226866 A1 * | 9/2012 | Bozek et al. | 711/122 |
| 2014/0025890 A1 * | 1/2014 | Bert et al. | 711/118 |
| 2014/0082621 A1 * | 3/2014 | Fitzgerald et al. | 718/1 |
| 2014/0143496 A1 * | 5/2014 | Bert | 711/130 |

OTHER PUBLICATIONS

Soundararajan, G., Chen, J., Sharaf, M.A. and C. Amza. Dynamic Partitioning of the Cache Hierarchy in Shared Data Centers. PVLDB (1): 635-646 (2008).*

* cited by examiner

*Primary Examiner* — Christian P Chace
*Assistant Examiner* — Tracy A Warren

(57) ABSTRACT

Techniques for automatically allocating space in a flash storage-based cache are provided. In one embodiment, a computer system collects I/O trace logs for a plurality of virtual machines or a plurality of virtual disks and determines cache utility models for the plurality of virtual machines or the plurality of virtual disks based on the I/O trace logs. The cache utility model for each virtual machine or each virtual disk defines an expected utility of allocating space in the flash storage-based cache to the virtual machine or the virtual disk over a range of different cache allocation sizes. The computer system then calculates target cache allocation sizes for the plurality of virtual machines or the plurality of virtual disks based on the cache utility models and allocates space in the flash storage-based cache based on the target cache allocation sizes.

48 Claims, 10 Drawing Sheets

AUTOMATED SPACE MANAGEMENT FOR SERVER FLASH CACHE

BACKGROUND

Server Flash Cache (SFC) is a technology that enables server systems to use flash storage to accelerate virtual machine (VM) I/O operations. An SFC-enabled server system caches, in a portion of a flash storage device referred to as a "flash cache," data that its hosted VMs read from and/or write to virtual disks (VMDKs) stored on, e.g., a traditional hard disk-based storage array. When the server system detects a VM read request, the server system services the read request, if possible, from the flash cache rather than from the storage array. Since the I/O latency for flash storage access is typically several orders of magnitude less than the I/O latency for hard disk access, this caching mechanism can significantly improve VM I/O performance.

Generally speaking, each VM or VMDK that a system administrator designates as being part of a server system's SFC configuration is associated with a dedicated portion of flash cache space referred to as the VM/VMDK's "cache allocation." The size of this cache allocation represents the maximum amount of data the flash storage device can cache for the VM or VMDK; once the cache allocation reaches this cap, the server system must begin deleting cache entries from the cache allocation in order to make room for additional data. An important aspect of managing SFC involves determining the optimal cache allocation size for each VM or VMDK. A VM/VMDK cache allocation size that is too small will decrease the utility of the flash cache for the VM/VMDK because the server system will delete a significant percentage of the VM/VMDK's cache entries before the VM can re-access them. On the other hand, a cache allocation size that is too large will unnecessarily consume space on the flash storage device—space that the server system can better utilize via allocation to one or more other VMs/VMDKs.

In current implementations, system administrators are required to manually define cache allocation sizes for VMs or VMDKs at the time of enabling SFC or at server startup. This manual approach is problematic for several reasons. First, growing CPU bandwidth and memory capacities are allowing for higher and higher VM-to-server consolidation ratios. This makes it increasingly difficult to manually carve out flash cache space on a per VM or VMDK basis, since the number of VMs or VMDKs that system administrators need to consider may be very large. Second, system administrators rely largely on heuristics and guesswork, rather than actual I/O statistics, when defining cache allocation sizes. Thus, more often than not, these manually-defined sizes result in suboptimal cache usage/efficiency. Third, system administrators typically perform cache allocation sizing as a one-time activity—in other words, once the system administrators have defined cache allocation sizes for a server system, the cache allocation sizes remain static throughout the server system's operational lifecycle. As a result, even if the cache allocation sizes work well upon initial configuration, various runtime events (e.g., changing VM workloads, changing storage device service times, events related to VM mobility, etc.) may cause those sizes to become less and less optimal over time.

SUMMARY

Techniques for automatically allocating space in a flash storage-based cache are provided. In one embodiment, a computer system collects I/O trace logs for a plurality of virtual machines or a plurality of virtual disks and determines cache utility models for the plurality of virtual machines or the plurality of virtual disks based on the I/O trace logs. The cache utility model for each virtual machine or each virtual disk defines an expected utility of allocating space in the flash storage-based cache to the virtual machine or the virtual disk over a range of different cache allocation sizes. The computer system then calculates target cache allocation sizes for the plurality of virtual machines or the plurality of virtual disks based on the cache utility models and allocates space in the flash storage-based cache based on the target cache allocation sizes.

The following detailed description and accompanying drawings provide a better understanding of the nature and advantages of particular embodiments.

DETAILED DESCRIPTION

Figure 1:
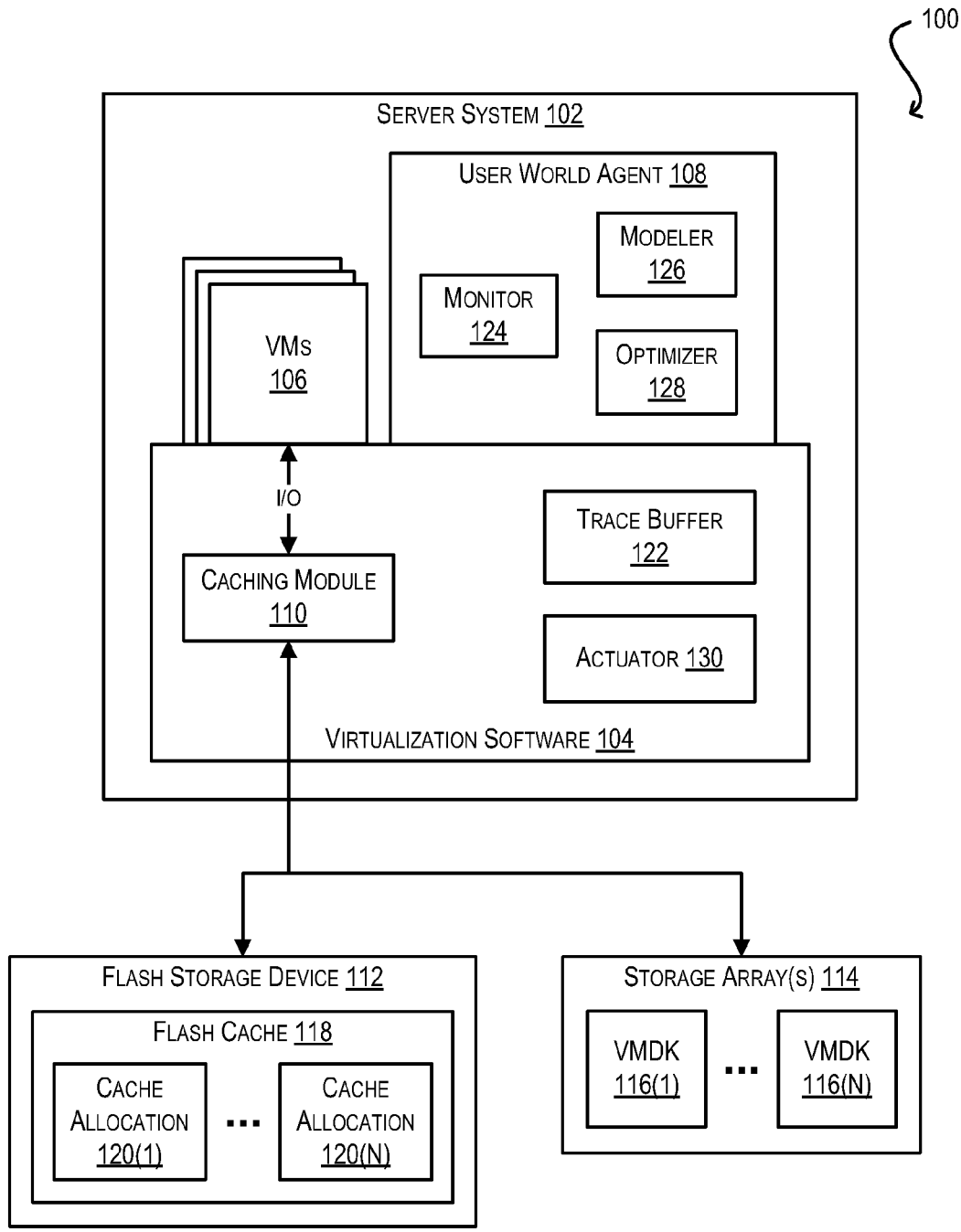
FIG. 1 depicts a block diagram of a system environment that supports automated flash cache space management according to one embodiment.

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

Particular embodiments relate to techniques for automatically allocating space in a flash storage-based cache (i.e., flash cache) among VMs executing on, or VMDKs accessible by, a server system. In one set of embodiments, the automated space management techniques described herein can be dynamic and workload-aware. For example, the server system can collect, in real-time or near real-time, I/O trace logs and other data pertaining to the workloads of the VMs/VMDKs as they are executed. The server system can then formulate, based on the collected information, a mathematical model for each VM/VMDK (referred to as a "cache utility model") that models the expected utility of allocating different cache sizes to the VM/VMDK, and can calculate optimal cache allocation sizes for the VMs/VMDKs based on the cache utility models. In a particular embodiment, each cache utility model can take into account various data dimensions derived from the collected information, such as the spatial locality of VM/VMDK I/O operations, the temporal locality of VM/VMDK I/O operations, I/O access characteristics (e.g., read/write ratio), backend storage device service times, and more. With this approach, the server system can dynamically optimize flash cache space in a manner that is more robust and precise than the heuristics-based methodology that system administrators apply in prior art implementations.

In further embodiments, the automated space management techniques described herein can be continuous and adaptive. In other words, the server system is not limited to performing cache allocation sizing at a single point in time; instead, the server system can continuously monitor for, e.g., significant changes in VM/VMDK workloads, VM/VMDK configuration events (e.g., VM power on/off, VM suspend/resume, VM/VMDK migration, etc.), and other conditions that would adversely affect existing flash cache allocations. When the server system detects such a condition, the server system can re-trigger the formulation of cache utility models and/or the calculation of per VM/VMDK cache allocation sizes, thereby ensuring that flash cache space remains optimally allocated.

In yet further embodiments, the automated space management techniques described herein can be driven by user-defined policies. For example, a system administrator can define weights or priorities for fine-tuning the distribution of cache space among VMs/VMDKs. As another example, a system administrator can define upper and lower bounds on the cache allocation size for each VM or VMDK. As yet another example, a system administrator can configure a time window for controlling the range of I/O data that the server system considers when calculating a temporal locality value for a VM or VMDK during cache utility model formulation. As described in further detail below, this time window can affect the responsiveness of the server system to transient I/O spikes, such as boot storms that can occur in Virtual Desktop Infrastructure (VDI) deployments.

FIG. 1 depicts a system environment 100 that supports automated flash cache space management according to one embodiment. System environment 100 includes a server system 102 that executes virtualization software 104. Virtualization software 104 (also known as a "hypervisor") is a software layer that provides an environment in which one or more VMs 106 can run. In one embodiment, virtualization software 104 can interact directly with the hardware platform of server system 102 without an intervening host operating system. In this embodiment, virtualization software 104 can include a kernel (not shown) that manages VM use of the various hardware devices of server system 102. In an alternative embodiment, virtualization software 104 can be part of a "hosted" configuration in which virtualization software 104 runs on top of a host operating system (not shown). In this embodiment, virtualization software 104 can rely on the host operating system for physical resource management of hardware devices. One of ordinary skill in the art will recognize various modifications and alternatives for the design and configuration of virtualization software 104.

As shown, virtualization software 104 includes a caching module 110 that interacts with a flash storage device 112 (e.g., a solid state disk (SSD), a PCIe-based flash card, a specialized flash appliance, etc.) and one or more storage arrays 114 (e.g., hard disk-based arrays). Storage arrays 114 store a number of virtual disks 116(1)-116(N) (generically referred to as "VMDKs") that VMs 106 access to read and write persistent data. In operation, caching module 110 can leverage flash storage device 112 to accelerate the I/O between VMs 106 and virtual disks 116(1)-116(N). For instance, caching module 110 can intercept data that VMs 106 read from and/or write to VMDKs 116(1)-116(N) and store the data in a flash cache 118 of flash storage device 112. At the same time, caching module 110 can detect read requests from VMs 106 and determine, for each read request, whether the requested data is available in flash cache 118—in other words, whether a "cache hit" has occurred. If a cache hit has occurred, caching module 110 can read the requested data from flash storage device 112 rather than from storage arrays 114.

In the embodiment of FIG. 1, flash cache 118 includes distinct segments (depicted as cache allocations 120(1)-120(N)) that map to VMDKs 116(1)-116(N). In alternative embodiments, flash cache 118 can include cache allocations that map to VMs 106. As noted in the Background section, the size of each cache allocation dictates an upper bound on the amount of data that flash cache 118 can hold for a VM/VMDK at a given time. Thus, the determination of these cache allocation sizes plays an important role in optimizing flash cache efficiency and efficacy. Unfortunately, prior art approaches that require system administrators to manually define cache allocation sizes suffer from a number of deficiencies (e.g., poor scalability, reliance on heuristics/guesswork, lack of adaptability, etc.).

To address this, server system 102 can include a number of cache management components—namely trace buffer 122, monitor module 124, modeler module 126, optimizer module 128, and actuator module 130. FIG. 1 depicts a particular configuration in which trace buffer 122 and actuator module 130 are part of virtualization software 104 while monitor module 124, modeler module 126, and optimizer module 128 are processes within a user world agent 108 that runs on top of virtualization software 104, but one of ordinary skill in the art will appreciate that alternative configurations are possible. In various embodiments, cache management components 122-130 can interoperate with each other (and with caching module 110) to automatically allocate space in flash cache 118 among VMs 106 or VMDKs 116(1)-116(N) in an optimal manner.

Figure 2:
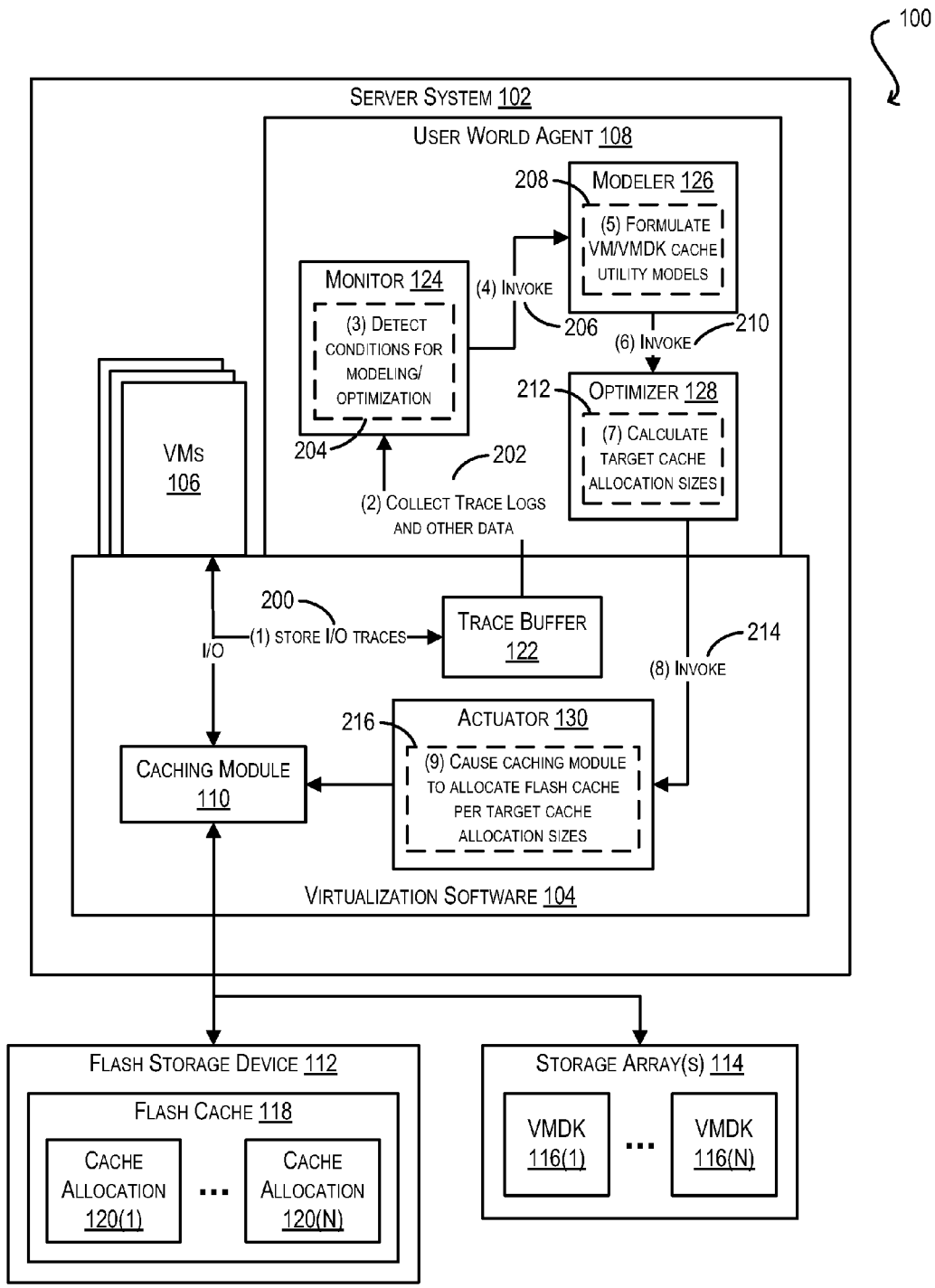
FIG. 2 depicts a flow within the block diagram of FIG. 1 for enabling automated flash cache space management according to one embodiment.

FIG. 2 depicts a data flow within system environment 100 that explains, at a high-level, how cache management components 122-130 can enable automated flash cache space management according to one embodiment. At step (1) of the flow (reference numeral 200), virtualization software 104 can intercept I/O operations from VMs 106 and store these operations, in the form of I/O trace logs, in trace buffer 122. In a particular embodiment, trace buffer 122 can maintain one I/O trace log for each VM or VMDK that has a corresponding cache allocation in flash cache 118.

At step (2) (reference numeral 202), monitor module 124 can collect the I/O trace logs from trace buffer 122, as well as other data (e.g., I/O statistics and VM configuration events) from virtualization software 104. Monitor module 124 can perform this collection process on a continuous basis during runtime of server system 102. Monitor module 124 can then detect, based on an analysis of the collected information, one or more conditions indicating that the cache allocation sizes for VMs 106 or VMDKs 116(1)-116(N) should be calculated (or re-calculated) (step (3); reference numeral 204). Examples of such conditions include an unusual deviation in the I/O statistics for a VM/VMDK or the occurrence of a VM configuration event that changes the number of cache allocations in flash cache 118 (e.g., a VM power on/off event, a VM mobility event, etc.). In response to the detection at step (3), monitor module 124 can invoke modeler module 126 (step (4); reference numeral 206) (in some embodiments, monitor module 124 can invoke optimizer module 128 rather than modeler module 126 at this point, which is described with respect to FIG. 3 below).

At step (5) (reference numeral 208), modeler module 126 can formulate, based on the I/O trace logs and other data that monitor module 124 has collected, a mathematical model (i.e., cache utility model) for each VM 106 or each VMDK 116(1)-116(N). This cache utility model can define (in the form of a cache utility value) the expected utility of the cache allocation associated with the VM or VMDK over a range of different cache allocation sizes. In other words, the cache utility model can provide an indication of how the effectiveness of the VM/VMDK's cache allocation varies with its size. For instance, an exemplary cache utility model for a VMDK X may output a cache utility value of 1 for a cache allocation size of 100 MB, a cache utility value of 4 for a cache allocation size of 200 MB, a cache utility value of 6 for a cache allocation size of 300 MB, a cache utility value of 6.1 for a cache allocation size of 400 MB, and a cache utility value of 6.15 for a cache allocation size of 500 MB. This indicates that the expected utility or effectiveness of the cache allocation for VMDK X grows quickly until the cache allocation reaches 300 MB in size. After 300 MB, the additional gains in cache utility are relatively small.

In certain embodiments, the cache utility model for a given VM or VMDK can take into account several data dimensions that modeler module 126 derives from the information collected by monitor module 124. In one embodiment, the cache utility model can take into account the locality of reference for the VM/VMDK's I/O workload (i.e., the probability that the VM/VMDK will access a given data block more than once). A VM or VMDK with a low locality workload typically will not benefit as much from caching as a VM or VMDK with a high locality workload. Within this data dimension, modeler module 126 can consider two types of data locality—spatial locality and temporal locality. Spatial locality refers to the spatial distance (i.e., number of I/O operations) between consecutive read accesses to the same data block. Temporal locality refers to temporal distance (i.e., difference in time) between consecutive read accesses to the same data block. By considering both spatial locality and temporal locality, modeler module 126 can ensure that the cache utility model reflects long-term trends in the VM/VMDK's workload, but is also responsive to short-term locality spikes. The manner in which modeler module 126 can quantify spatial locality and temporal locality is described with respect to FIG. 4B below.

In a further embodiment, the cache utility model can take into account I/O access characteristics for the VM/VMDK's I/O workload. For example, the cache utility model can take into account the VM/VMDK's read/write ratio, which corresponds to the number of read operations that a VM generates (or a VMDK receives) divided by the number of write operations that the VM generates (or the VMDK receives). A VM or VMDK that has a write-heavy workload may receive smaller benefit and may incur higher costs when cached in flash cache 118 due to the asymmetric read-write performance of flash storage devices and write durability concerns.

In yet a further embodiment, the cache utility model can take into account the service times, or latency, of the physical storage devices (e.g., storage arrays) backing the VMDK associated with the cache utility model (or backing the VMDKs accessed by the VM associated with the cache utility model). Generally speaking, a VMDK that is stored on relatively fast physical storage (e.g., a flash-based storage array) will benefit less from a large cache allocation size in flash cache 118 compared to a VMDK that is stored on slower physical storage (e.g., a hard disk-based array). In addition, the speed of a physical storage device or array will depend not only on hardware characteristics, but also on the overall load of the device/array.

Once modeler module 126 has created cache utility models for each VM 106 or each VMDK 116(1)-116(N) as noted above, modeler module 126 can invoke optimizer module 128 (step (6); reference numeral 210). In response, optimizer module 128 can calculate, using the cache utility models, target cache allocation sizes for VMs 106 or VMDKs 116(1)-116(N) that represent an optimal allocation of space in flash cache 118. In one embodiment, this calculation process can include defining an objective function corresponding to an aggregation of the output of the cache utility models for VMs 106 or VMDKs 116(1)-116(N), where the input cache allocation size to each cache utility model is an unknown variable. Optimizer module 126 can then determine, via, e.g., a standard linear constraint solver, the permutation of cache allocation sizes that maximize the objective function (subject to the constraint that the sum total of the cache allocation sizes cannot exceed the total size of flash cache 118). The cache allocation sizes that maximize the objective function represent the optimal (i.e., target) cache allocation sizes.

In a particular embodiment, the objective function can include user-defined per VM/VMDK weights, such that optimizer module 128 assigns higher-weighted VMs/VMDKs relatively larger cache allocation sizes and assigns lower-weighted VMs/VMDKs relatively smaller cache allocation sizes. In another embodiment, optimizer module 128 can take into account user-defined per VM/VMDK maximum and minimum cache allocation sizes by applying these bounds as additional constraints in the constraint solver.

Upon calculating the target cache allocation sizes, optimizer module 128 can invoke actuator module 130 (step (8); reference numeral 214). Finally, at step (9) (reference numeral 216), actuator module 130 can interoperate with caching module 110 to enforce the target cache allocation sizes and thereby redistribute the cache allocations in flash cache 118. In one embodiment, actuator module 130 and caching module 110 can implement a "lazy" strategy for re-allocating space in flash cache 118 that minimizes the likelihood of thrashing back and forth between different sets of cache allocation sizes. This lazy strategy is described with respect to FIGS. 7A and 7B below.

The flash cache space management solution described with respect to FIG. 2 provides a number of advantages over prior art manual techniques. First, since the solution of FIG. 2 relies on actual data pertaining to the I/O workloads of VMs 106 or VMDKs 116(1)-116(N) and processes this data in the framework of a mathematical optimization problem, server system 102 can optimize the space in flash cache 118 more efficiently and precisely than previously possible via manual, heuristics-based approaches. Second, since the solution of FIG. 2 operates continuously during runtime of server system 102, server system 102 can automatically respond to changes that may adversely existing flash cache allocations and can quickly re-allocate flash cache space as necessary. Third, since the solution of FIG. 2 provides policy-based automation (via, e.g., user-defined VM/VMDK weights and other user-defined inputs), this solution can easily scale to support very large numbers of VM/VMDKs while still providing a level of administrator control. In some embodiments, system administrators may use this solution to automatically allocate flash cache space across the VMs/VMDKs in an entire server cluster rather than in a single server system.

Figure 3A:
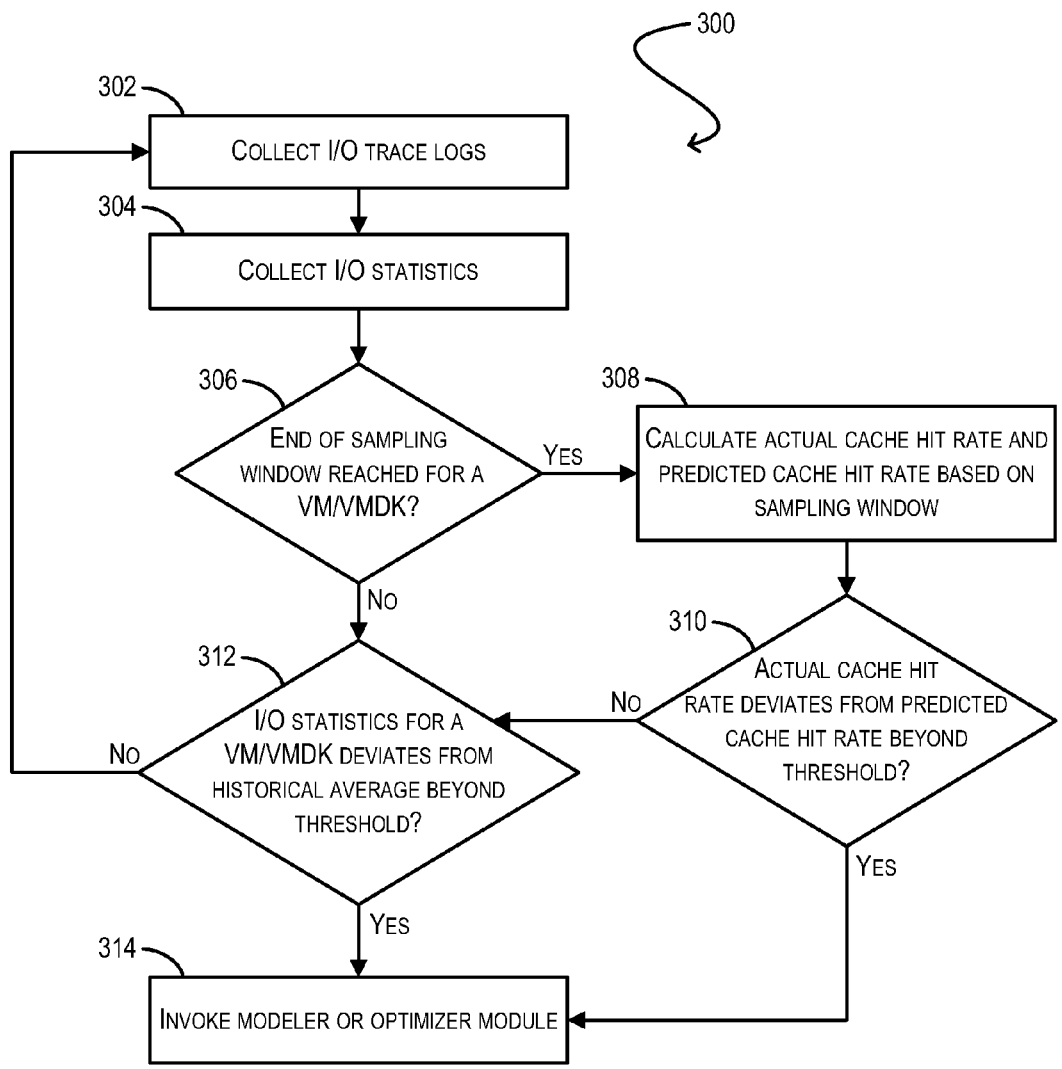
FIGS. 3A and 3B depict flowcharts for monitoring I/O statistics and other information (e.g., VM event notifications) according to one embodiment.

FIG. 3A depicts a process 300 that provides a more detailed description of the processing attributed to monitor module 124 of FIGS. 1 and 2 according to one embodiment. At block 302, monitor module 124 can collect I/O trace logs for VMs 106 or VMDKs 116(1)-116(N) from trace buffer 122. Each I/O trace log can be associated with a particular VM or VMDK and can include a plurality of log entries that identify I/O operations that have been generated by the VM (or directed to the VMDK). The following shows the structure of an exemplary log entry:

```
struct cache_io_stats {
    uint16 VM_UUID;
    uint16 VMDK_UUID;
    uint16 timestamp;
    uint8 isRead;
    uint32 lba;
    uint8 len;
    uint16 latency;
}
```

In the example above, VM_UUID is an identifier that uniquely identifies the VM that originated the I/O operation (at the cluster level); VMDK_UUID is an identifier that uniquely identifies the VMDK to which the I/O operation is directed (at the cluster level); timestamp is the time at which virtualization software 104 has logged the I/O operation in trace buffer 122; is Read is a flag indicating whether the I/O operation is a read operation; lba is a value indicating the logical block address of the VMDK that is the target of the I/O operation; len is the number of data blocks (at, e.g., 4 KB granularity) that the VM is reading or writing; and latency is a value representing the total service time needed to complete the I/O operation. Although not shown in this data structure, virtualization software 104 can tag each log entry to indicate whether caching module 110 has serviced (or will service) the I/O operation from flash storage device 112 or storage arrays 114.

At block 304, monitor module 124 can collect I/O statistics that virtualization software 104 generates. These I/O statistics can include, e.g., a moving window average of TOPS, I/O latency, read/write ratio, request sizes, etc. on a per VM or per VMDK basis. In certain embodiments, the moving window over which virtualization software averages these metrics can be based on a user-defined "time window" parameter. In a particular embodiment, the time window parameter can be 20 seconds, 60 seconds, or longer. As discussed below, modeler module 126 can use this same user-defined time window parameter to determine a temporal locality value for the VM/VMDK during cache utility model formulation.

Starting at block 306, monitor module 124 can perform a series of steps to adaptively determine whether monitor module 124 should trigger modeler module 126 and/or optimizer module 128 to allocate (or re-allocate) space in flash cache 118. For example, at block 306, monitor module 124 can determine whether it has collected a predefined number of log entries in the I/O trace log for a particular VM or VMDK. This predefined number is referred to as the "sampling window" parameter. In one embodiment, the sampling window parameter can be 256,000. If monitor module 124 has collected this predefined number of log entries, monitor module 124 can calculate an actual cache hit rate based on the sampling window—in other words, monitor module 124 can determine, among the log entries in the I/O trace log, what percentage of the log entries correspond to cache hits in the VM/VMDK's current cache allocation (block 308). Monitor module 124 can also calculate a predicted cache hit rate for the VM/VMDK's current cache allocation based on, e.g., a previously created cache utility model for the VM/VMDK (if such a model exists) (block 308). Monitor module 124 can then determine a deviation between the actual cache hit rate and the predicted cache hit rate. If the deviation exceeds a certain threshold, monitor module 124 can invoke modeler module 126 (block 314). On the other hand, if the deviation does not exceed the threshold (or if the end of a VM/VMDK sampling window has not been reached per block 306), monitor module 124 can proceed to block 312.

At block 312, monitor module 124 can determine whether one or more of the I/O statistics for a particular VM or VMDK (as collected at block 304) deviates from a historical average beyond a certain threshold. For instance, as part of this step, monitor module 124 can determine whether the IOPs for the VM or VMDK (as averaged over the most current time window) exceeds the VM/VMDK's historical TOPS average by, e.g., two standard deviations or more. If so, monitor module 124 can invoke modeler module 126 (block 314). If not, process 300 can loop back to block 302. Monitor module 124 can then repeat the entire process of collecting I/O trace logs and other data and adaptively determining whether it should invoke the modeler and/or optimization modules. In this way, monitor module 124 can continuously monitor for, and act upon, conditions that require a re-allocation of space in flash cache 118.

Figure 3B:
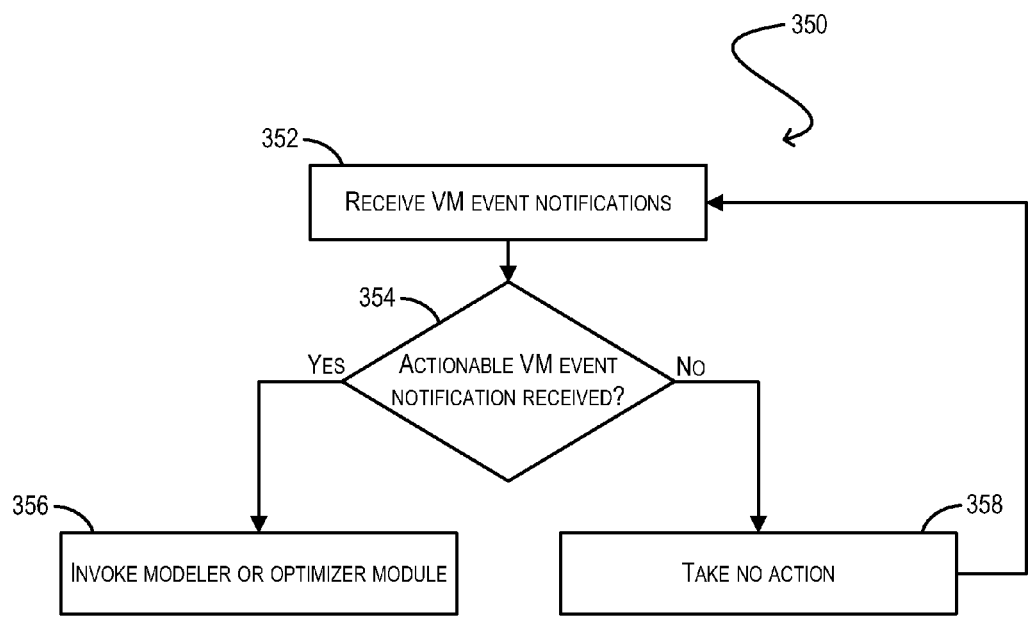

FIG. 3B depicts a process 350 that monitor module 124 can perform in parallel with process 300 of FIG. 3A. Via process 350, monitor module can detect and act upon VM event notifications that may require a change to the cache allocation sizes of flash cache 118.

At block 352, monitor module 124 can receive notifications of VM events from virtualization software 104. These VM events can arise from both administrator-initiated actions and system-generated resource optimizations. Examples of such VM events include VM power on/off, VM suspend/resume, migration of a VM (e.g., "vMotion") to another server system, migration of a VM to server system 102, migration of a VMDK (e.g., "Storage vMotion") to another physical storage device/array, an offline storage device/array change, VM boot strap, and VM fast suspend/stun.

At block 354, monitor module 124 can determine whether it has received an actionable VM event notification. In this context, an actionable VM event notification is a notification of a VM event that will likely require re-allocation of cache allocation sizes in flash cache 118 (due to, e.g., a change in the number of cache allocations or other factors). If monitor module 124 has received an actionable VM event notification, monitor module 124 can either invoke modeler module 126 or directly invoke optimizer module 128 (in order to calculate/re-calculate cache allocation sizes without building cache utility models) (block 356). In a particular embodiment, the invocation of modeler module 126 or optimizer module 128 at block 356 will terminate parallel process 300 of FIG. 3A. Monitor module 124 can also perform one or more other actions in addition to or in lieu of these invocations. The following table identifies an exemplary list of VM events and corresponding actions that monitor module 124 may take in response to the events.

TABLE 1

| VM Event | Action |
|---|---|
| VM power off/suspend/ migration to another server system | Invoke optimizer module 128; free memory buffers for the I/O trace logs associated with the VM |
| VM migration to server system 102 | Invoke optimizer module 128; receive I/O trace log information and other data from the originating server system; use the received information as initial input for the optimization process |
| VMDK migration (i.e., online backend storage device/array change) | Suspend modeling or optimization until completion; evict storage device service times history; invoke optimizer module 128 |
| VM boot strap/power on/ resume; offline backend storage device/array change | Allocate initial cache allocation size for the VM (or the VMDKs the VM accesses) using the user-defined minimum size and weight |

TABLE 1-continued

| VM Event | Action |
| --- | --- |
| VM fast suspend/stun | Reserve the cache allocation size for the VM (or the VMDKs the VM accesses) such that server system cannot re-allocate this space other VMs/VMDKs |

If, at block 354, monitor module 124 has not received an actionable VM event notification, monitor module 124 can take no action with respect to the received VM event notifications (block 358). Process 350 can then loop back to block 352, where monitor module 124 can continue to receive and process additional VM event notifications.

Figure 4A:
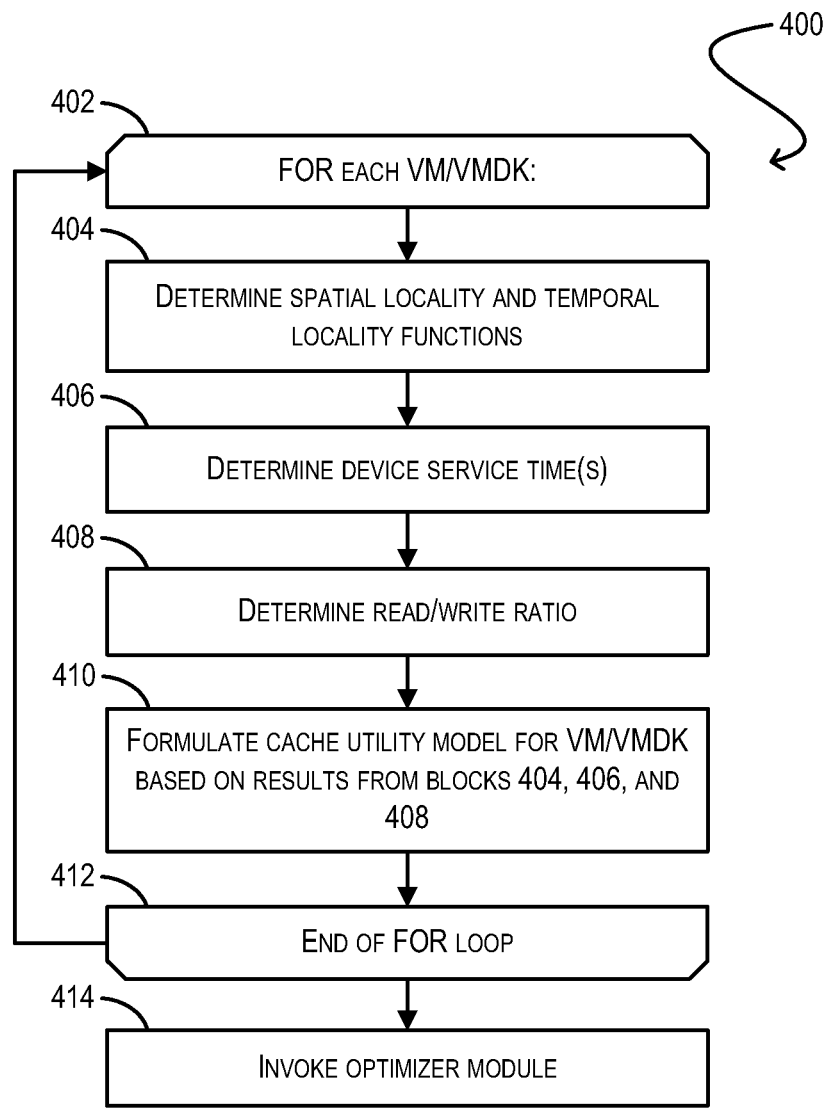
FIGS. 4A and 4B depict flowcharts for formulating per VM/VMDK cache utility models according to one embodiment.
Figure 5A:
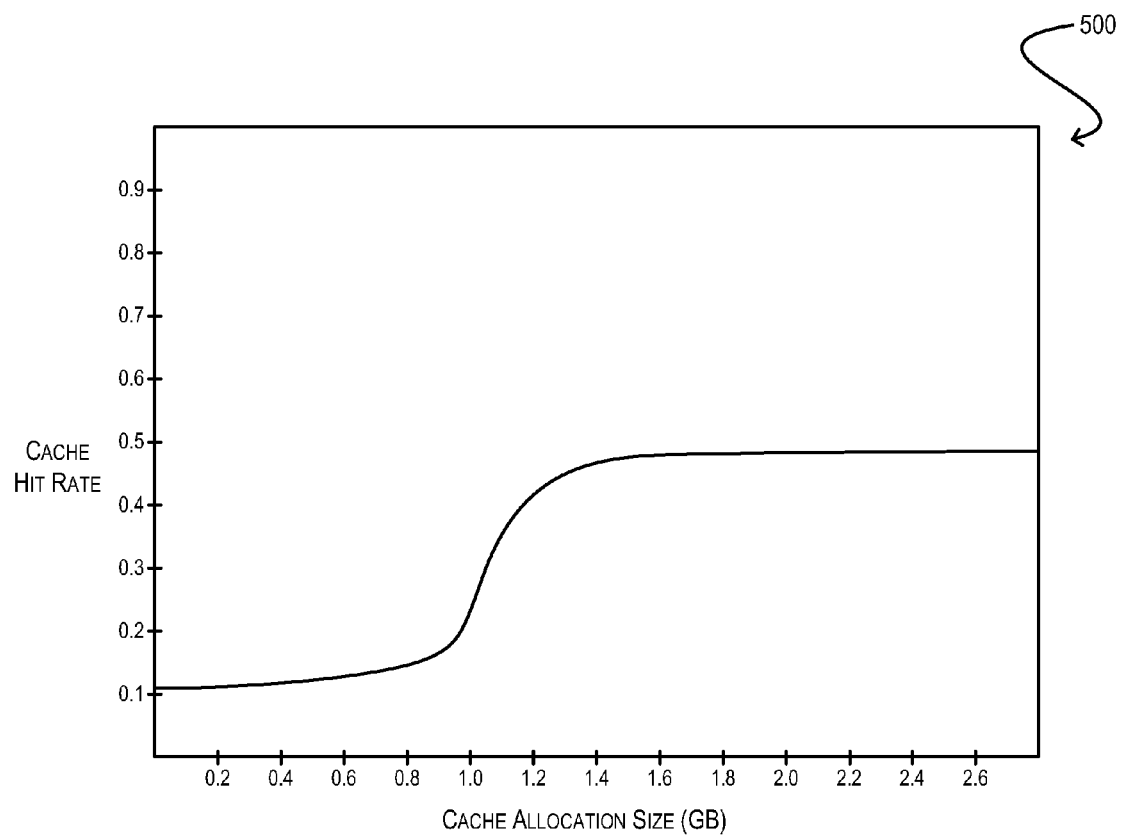
FIG. 5A depicts a graph representing a spatial locality function according to one embodiment.

FIG. 4A depicts a process 400 that provides a more detailed description of the processing attributed to modeler module 126 of FIGS. 1 and 2 according to one embodiment. At block 402, modeler module 126 can enter a loop for each VM 108 or VMDK 116(1)-116(N). Within this loop, modeler module 126 can first quantify the spatial locality and the temporal locality for the VM/VMDK's I/O workload by determining a spatial locality function ($L_{spatial}$) and a temporal locality function ($L_{temporal}$) respectively. The spatial locality function defines the probability of a cache hit (i.e., cache hit rate) as a function of the VM/VMDK's cache allocation size. In one embodiment, modeler module 126 can determine the spatial locality function by considering all of the I/O trace log entries for the VM/VMDK over the sampling window parameter described with respect to FIG. 3 (typically 256K log entries or I/O operations). Thus, the spatial locality function can capture long-term trends in the VM/VMDK's I/O workload. By way of example, FIG. 5A depicts a graphical representation of an exemplary spatial locality function 500. In the example of FIG. 5A, the cache hit rate of spatial locality function 500 increases modestly until a cache allocation size of about 1 GB. The cache hit rate then increases dramatically for cache allocation sizes from 1 GB to about 1.4 GB. After 1.4 GB the cache hit rate levels off, indicating that active working dataset for the VM/VMDK generally fits within a cache allocation size of 1.4 GB.

Figure 5B:
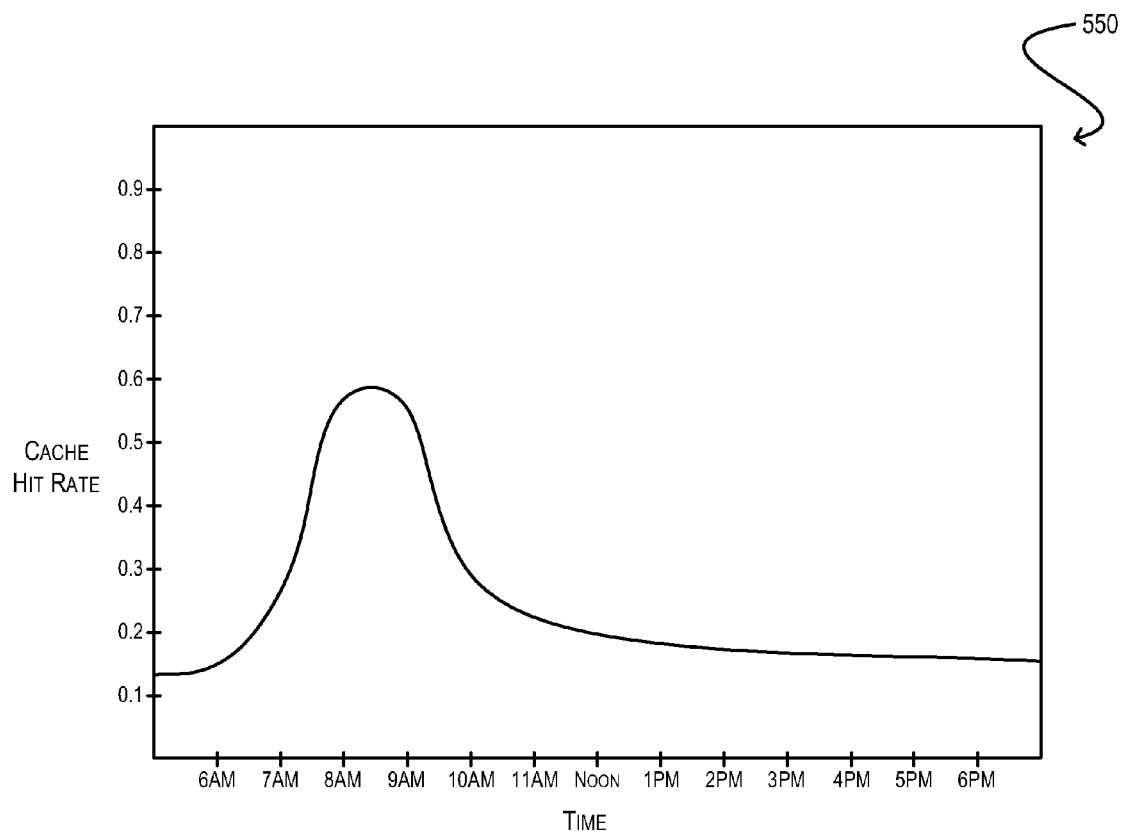
FIG. 5B depicts a graph representing a temporal locality function according to one embodiment.

The temporal locality function defines the probability of a cache hit as a function of time. Thus, the temporal locality function can be useful for identifying transient and fast-moving locality spikes in the VM/VMDK's I/O workload. Such a spike can occur, for instance, as a result of a boot storm in a VDI deployment. During a boot storm, many users login to VM instances on a VDI server that share access to the same VMDK (e.g., a base OS VMDK). Accordingly, the I/O read pattern for that VMDK spikes upon dramatically for a relatively short period of time. FIG. 5B depicts a graphical representation of an exemplary temporal locality function 550 that exhibits this type of spike. For example, as shown in FIG. 5B, the cache hit rate of temporal locality function 550 remains low until approximately 7 AM. Starting at 7 AM, the cache hit rate spikes up and reaches a high at between 8 AM and 9 AM. The cache hit rate then returns to its original, lower level after approximately 10 AM.

Figure 4B:
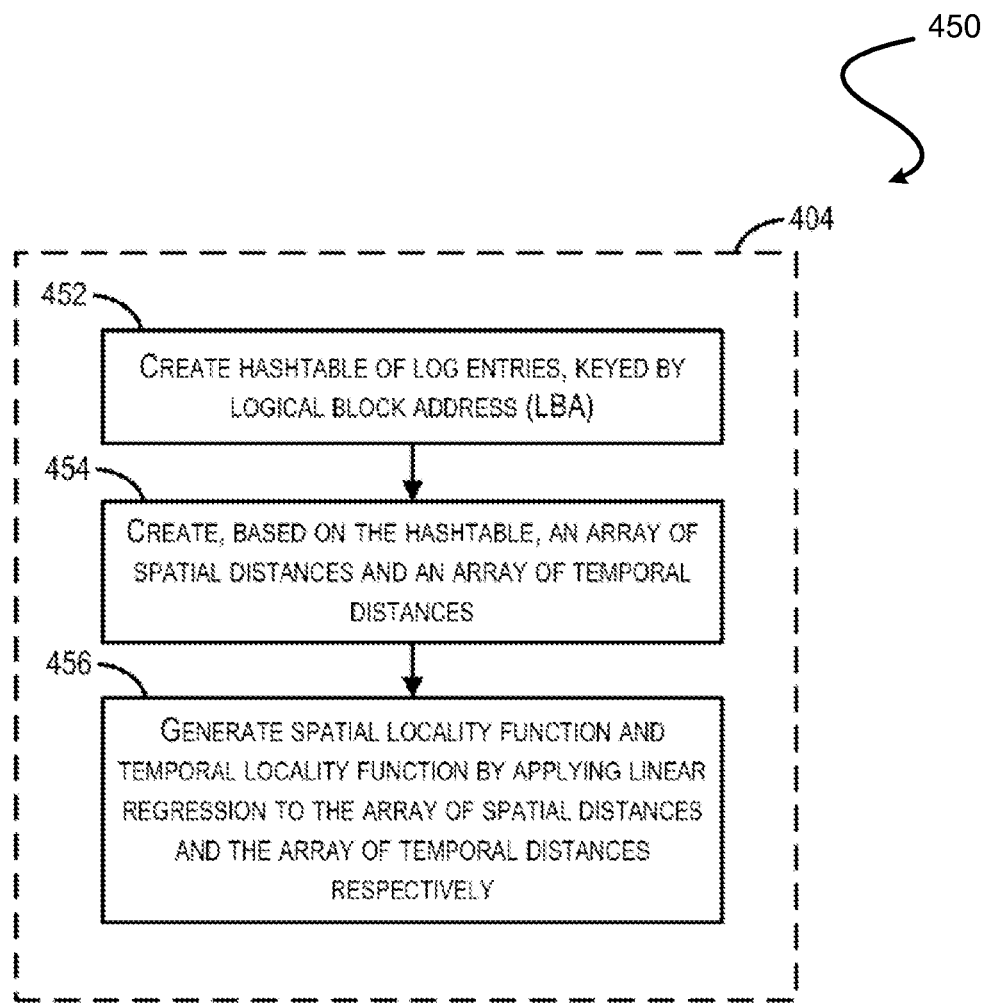

FIG. 4B depicts a process 450 for determining the spatial and temporal locality functions for a given VM or VMDK according to one embodiment. In various embodiments, modeler module 126 can perform the steps of process 450 within the context of block 404 of FIG. 4A. At block 452, modeler module 126 can create a hashtable of I/O trace log entries for the VM/VMDK, where each entry of the hashtable is keyed by a LBA (logical block address) and includes a linked list of log entries directed to that LBA. Although not shown in FIG. 4B, in some embodiments, modeler module 126 can pre-process the VM/VMDK I/O trace log prior to block 452 in order to address large block I/Os and to align certain block accesses (e.g., block accesses that are not aligned at 4 KB boundaries).

At block 454, modeler module 126 can traverse the hashtable and create an array of spatial distances and an array of temporal distances. The array of spatial distances is an unordered list of entries where each array entry identifies a number of I/O operations between consecutive accesses to the same LBA. The array of temporal distances is an unordered list of entries where each array entry identifies a time difference between consecutive accesses to the same LBA. As part of the processing at block 454, modeler module 126 can keep track of log entries in the hashtable that correspond to a write operation (rather than a read operation) and can increment an "invalidate" counter for each such entry. In addition, modeler module 126 can keep track of log entries in the hashtable that do not correspond to a repeat access to a previously-accessed LBA and can increment a "no-hit" counter for each such entry.

Once modeler module 126 has created the arrays of spatial and temporal distances, modeler module 126 can apply a standard linear regression analysis to cover the arrays into the a spatial locality function (as shown in FIG. 5A) and a temporal locality function (as shown in FIG. 5B) (block 456). In one embodiment, the linear regression analysis can take into account the invalidate and no-hit counters incremented at block 454, thereby adjusting the spatial and temporal locality functions to, e.g., output lower values if there are a high number of read operations or if there are a high number of non-repeat read accesses.

Returning to FIG. 4A, at blocks 406 and 408, modeler module 126 can determine device service times for the back-end storage devices/arrays backing the VM/VMDK (S_Time) and a read/write ratio for the VM/VMDK (RW). As noted above with respect to FIG. 3, monitor module 124 collects this information from virtualization software 104. Modeler module 126 can then formulate a cache utility model for the VM/VMDK based on the spatial and temporal locality functions, the device service times, and the read/write ratio (block 410). Thus, the cache utility model can take into account all of these factors to model the expected utility of a range of cache allocation sizes for the VM/VMDK. The following is an exemplary representation of a cache utility model (Utility) that takes as input a cache allocation size s:

$$\text{Utility}(s) = S_{Time}*RW*|L_{spatial}(s) + L_{temporal}(T\_\text{Window})|$$

In the example above, T_Window corresponds to the user-defined time window parameter described with respect to FIG. 3 and dictates the temporal range of I/O trace log entries that modeler module 126 should take into account when generating a temporal locality value for the cache utility model. This parameter can be on the order of seconds, minutes or more. Generally speaking, a lower T_Window will enable server system 102 to react more quickly to transient locality spikes, but is more likely to skew the downstream output of optimizer module 128.

At block 412, modeler module 126 reaches the end of the VM/VMDK loop and thus can return to block 402 to process additional VMs/VMDKs. Once modeler module 126 has formulated cache utility models for every VM/VMDK that is a part of the flash cache configuration, modeler module 126 can invoke optimizer module 128 (block 414).

Figure 6:
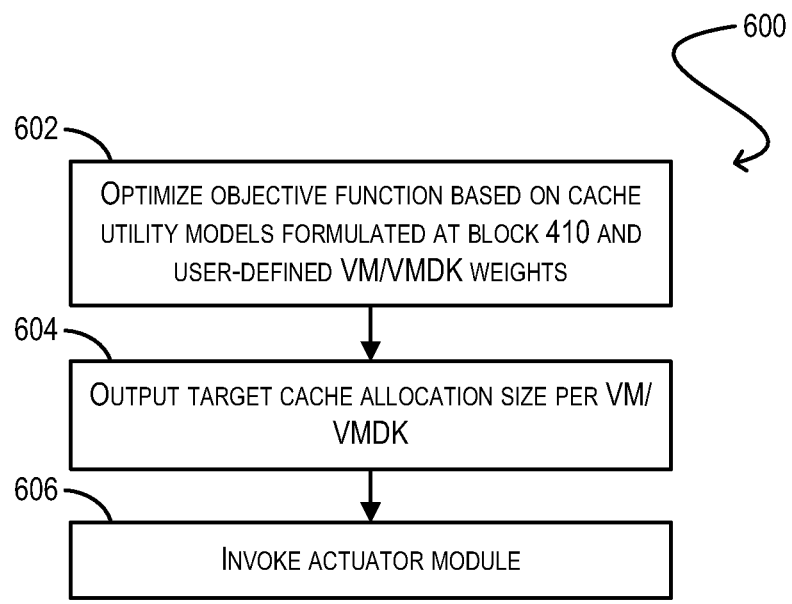
FIG. 6 depicts a flowchart for calculating target cache allocation sizes according to one embodiment.

FIG. 6 depicts a process 600 that provides a more detailed description of the processing attributed to optimizer module

128 of FIGS. 1 and 2 according to one embodiment. At block 602, optimizer module 128 can define, and subsequently optimize, an objective function based on the cache utility models that modeler module 126 formulated in FIG. 4A and a set of user-defined per VM or per VMDK weights. The objective function can correspond to a summation of the outputs of the cache utility models multiplied by the weights, where the input cache allocation size for each cache utility model is an unknown variable, and where the goal of optimizing the objective function is to determine a permutation of cache allocation sizes that maximize the total value of the summation. The following is an exemplary representation of the objective function, where n corresponds to the total number of VMs or VMDKs:

$$MAX \sum_{i=1}^{n} Weight_i * Utility_i(s_i)$$

The objective function above can be subject to a number of constraints. For example, one such constraint can require that the sum total of cache allocation sizes cannot exceed the total size of flash cache 118 or flash storage device 112 (M). This constraint can be expressed as:

$$s_1 + s_2 + \ldots + s_n = M$$

The objective function can also be subject to a number of constraints derived from user-defined maximum and/or minimum cache allocation sizes for each VM/VMDK.

In a particular embodiment, optimizer module 128 can optimize the objective function above by inputting the objective function and its associated constraints into a standard linear constraint solver. The linear constraint solver can then output a set of optimal (i.e., "target") cache allocation sizes (block 604). In other embodiments, optimizer module 128 can use other types of constraint solvers (e.g., non-linear, piecewise linear, etc.) that provide different tradeoffs in terms of accuracy, speed, and required CPU power.

Once optimizer module 128 has calculated and output target cache allocation sizes per blocks 602 and 604, optimizer module 128 can invoke actuator module 130.

Figure 7A:
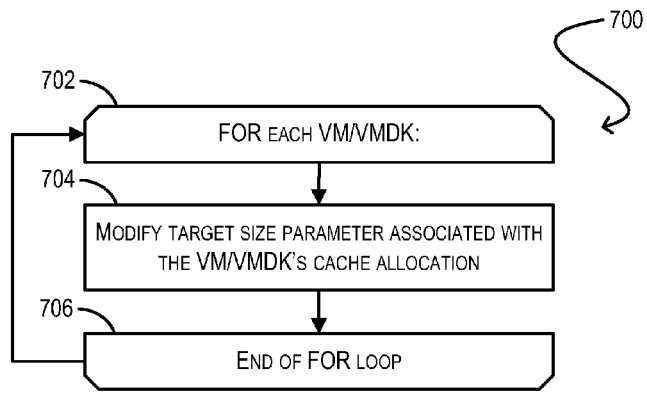
FIGS. 7A and 7B depict flowcharts for allocating flash cache space based on target cache allocation sizes according to one embodiment.
Figure 7B:
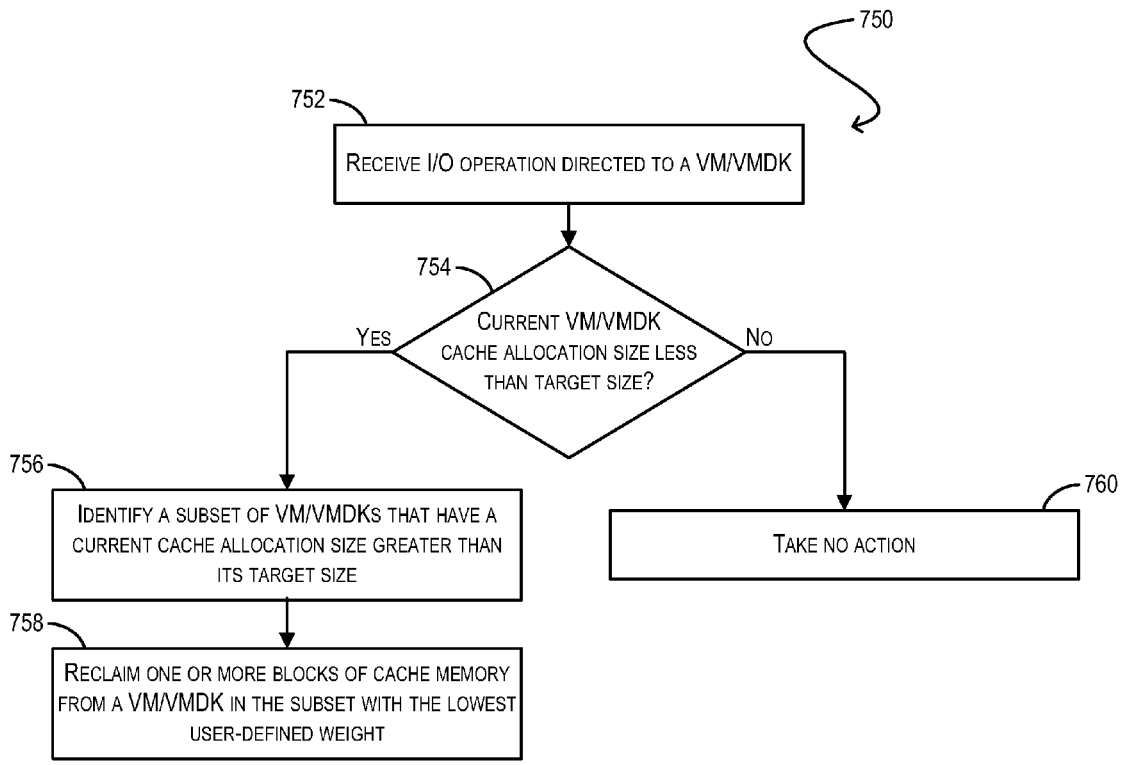

FIGS. 7A and 7B depict processes 700 and 750 respectively that actuator module 130 and caching module 110 can perform to reallocate space in flash cache 118 based on the target cache allocation sizes calculated in FIG. 6 according to one embodiment. Processes 700 and 750 reflect a "lazy" strategy to flash cache reallocation that minimizes the likelihood of thrashing back and forth between different sets of cache allocation sizes.

At block 702 of FIG. 7A, actuator module 130 can enter a loop for each VM 106 or VMDK 116(1)-116(N). At block 704, actuator module 130 can modify a "target size" parameter that caching module 110 maintains for the VM/VMDK's cache allocation. Significantly, the modification of this target size parameter does not immediately change the size of the VM/VMDK's cache allocation in flash cache 118. At block 706 126, actuator module 130 reaches the end of the VM/VMDK loop and thus can repeat this loop until all VM/VMDKs are processed.

Turning now to FIG. 7B, at block 752, caching module 110 can receive an I/O operation from a VM 106 that is directed to a VMDK 116(1)-116(N). At block 754, caching module 110 can determine whether the current cache allocation size for the VM or VMDK is less than the target size set for the VM/VMDK at block 704 of FIG. 7A. If the current size is greater than the target size, caching module 110 does not need to take any action for resizing the VM/VMDK's cache allocation (block 760).

On the other hand, if the current size is less than the target size, caching module 110 can identify a subset of VMs or VMDKs that have a current cache allocation size greater than its target size (block 756). Caching module 110 can resize the cache allocation of the current VM/VMDK by reclaiming one or more blocks of memory in flash cache 118 from a VM/VMDK in the subset identified at block 756 that has the lowest user-defined weight. (block 758). In one embodiment, as part of block 758, caching module 110 may only reclaim the minimum number of blocks necessary to cache the data associated with the I/O operation received at block 752. In this way, caching module 110 can minimize the amount of I/O traffic to/from flash cache 118 due to cache allocation resizing. The next time caching module 110 receives another I/O operation from the same VM 106 (or directed to the same VMDK 116(1)-116(N)), caching module 110 can reclaim one or more additional blocks to cache that I/O operation. This can continue until caching module 110 has reclaimed enough memory blocks to reach the target size for the VM/VMDK cache allocation.

There are a couple of advantages to the cache allocation approach shown in FIGS. 7A and 7B. First, since caching module 110 only changes the actual cache allocation size for a particular VM/VMDK on an "as-needed" basis (i.e., upon receiving an I/O operation from/directed to that VM/VMDK), the work that caching module 112 needs to perform for cache allocation resizing is distributed over time. Second, this approach minimizes thrashing (i.e., situations where caching module 110 rapidly oscillates between two sets of cache allocation sizes).

Although not shown in FIGS. 7A and 7B, in certain embodiments, actuator module 130 can also control the bootstrapping process that occurs when server system 102 is first brought up or new VMs/VMDKs are added. In the former case, actuator module 130 can allocate (via the target size parameter) an initial cache allocation size to each VM/VMDK that is proportional to the VM/VMDK's user-defined weight. In the latter case, actuator module 130 can allocate (via the target size parameter) an initial cache allocation size to a newly added VM or VMDK based on that VM/VMDK's user-defined minimum size. Actuator module 130 or caching module 110 can reclaim this space from the existing cache allocations of one or more other VM/VMDKs, such that the reclamation is proportional to the VM/VMDK user-defined weights.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments may be useful machine operations. In addition, one or more embodiments also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations. The various embodiments described herein may be practiced with other computer system configurations including hand-held devices, microprocessor systems, microprocessor-based or programmable consumer electronics, minicomputers, mainframe computers, and the like.

One or more embodiments may be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer. Examples of a non-transitory computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The non-transitory computer readable medium can also be distributed over a network coupled computer system so that the computer readable code is stored and executed in a distributed fashion.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, various virtualization operations may be wholly or partially implemented in hardware.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method for automatically allocating space in a flash storage-based cache, the method comprising:
    collecting, by a computer system, an input/output (I/O) trace log for each virtual machine in a plurality of virtual machines or each virtual disk in a plurality of virtual disks;
    determining, by the computer system, a cache utility model for each virtual machine or each virtual disk based on the I/O trace log for the virtual machine or the virtual disk, the cache utility model defining an expected utility of allocating space in the flash storage-based cache to the virtual machine or the virtual disk over a range of different cache allocation sizes, wherein the cache utility model for each virtual machine or each virtual disk includes a spatial locality function and a temporal locality function, the spatial locality function modeling a probability of a cache hit as a function of cache allocation size, the temporal locality function modeling a probability of a cache hit as a function of time, and wherein the spatial locality function and the temporal locality function are generated by:
        reading log entries in the I/O trace log of the virtual machine or the virtual disk, each log entry identifying a logical block address (LBA),
        creating a hashtable based on the log entries, each hashtable entry being keyed by the LBA and including one more log entries from the I/O trace log corresponding to the hashtable entry's LBA key,
        creating, based on the hashtable, an array of spatial distances and an array of temporal distances, each entry in the array of spatial distances identifying a number of I/O operations between consecutive read accesses to a single LBA in the I/O trace log, each entry in the array of temporal distances identifying a time interval between consecutive read accesses to a single LBA in the I/O trace log, and
        applying a linear regression analysis to the array of spatial distances and the array of temporal distances respectively;
    calculating, by the computer system, target cache allocation sizes for the plurality of virtual machines or the plurality of virtual disks based on the cache utility models; and
    allocating, by the computer system, space in the flash storage-based cache based on the target cache allocation sizes.

2. The method of claim 1 wherein the cache utility model for each virtual machine or each virtual disk takes into account a spatial locality of I/O operations identified in the I/O trace log for the virtual machine or the virtual disk.

3. The method of claim 2 wherein the cache utility model for each virtual machine or each virtual disk further takes into account a temporal locality of I/O operations identified in the I/O trace log for the virtual machine or the virtual disk.

4. The method of claim 3 wherein the temporal locality is based on a user-defined time window.

5. The method of claim 1 further comprising collecting I/O statistics for the plurality of virtual machines or the plurality of virtual disks at predefined time intervals, the I/O statistics including I/O operations per second (LOPS) for each virtual machine or each virtual disk, service times of one or more physical storage devices associated with each virtual machine or each virtual disk, and a read/write ratio for each virtual machine or each virtual disk.

6. The method of claim 5 wherein determining a cache utility model for each virtual machine or each virtual disk is further based on the service times and the read/write ratio for the virtual machine or the virtual disk.

7. The method of claim 5 further comprising, prior to determining a cache utility model for each virtual machine or each virtual disk:
   detecting that one or more of the I/O statistics have changed beyond a threshold; and
   triggering the determining of a cache utility model for each virtual machine or each virtual disk in response to the detecting.

8. The method of claim 1 further comprising, prior to determining a cache utility model for each virtual machine or each virtual disk:
   detecting when a predetermined number of log entries have been collected in the I/O trace log for a virtual machine or a virtual disk; and
   in response to the detecting:
      calculating, based on the log entries, an actual cache hit rate for the virtual machine or the virtual disk;
      calculating, based on a previously determined cache utility model, a predicted cache hit rate for the virtual machine or the virtual disk; and
      if the actual cache hit rate deviates from the predicted cache hit rate beyond a threshold, triggering the determining of cache utility models.

9. The method of claim 1 further comprising receiving one or more VM event notifications.

10. The method of claim 9 wherein the one or more VM event notifications include a VM power on/off event notification, a VM suspend/resume event notification, or a VM mobility event notification.

11. The method of claim 10 further comprising triggering the determining of a cache utility model for each virtual machine or each virtual disk or the calculating of target cache allocation sizes based on the one or more VM event notifications.

12. The method of claim 1 wherein calculating target cache allocation sizes for the plurality of virtual machines or the plurality of virtual disks comprises:
   defining an objective function based on the cache utility model for each virtual machine or each virtual disk and a user-defined weight assigned to the virtual machine or the virtual disk; and
   optimizing the objective function.

13. The method of claim 12 wherein the objective function is subject to a constraint indicating that a sum of the target cache allocation sizes cannot exceed a size of the flash storage-based cache.

14. The method of claim 13 wherein the objective function is subject to a further constraint indicating that the target cache allocation size for each virtual machine or each virtual disk cannot exceed a maximum user-defined cache allocation size for the virtual machine or the virtual disk and cannot go below a minimum user-defined cache allocation size for the virtual machine or the virtual disk.

15. The method of claim 1 wherein allocating space in the flash-storage based cache based on the target cache allocation sizes comprises:
   modifying, for each virtual machine or each virtual disk, a target size parameter based on the target cache allocation size for the virtual machine or the virtual disk; and
   upon servicing an I/O request directed to a first virtual machine or a first virtual disk:
      determining a current cache allocation size for the first virtual machine or the first virtual disk; and
      if the current cache allocation size is less than the target size parameter for the first virtual machine or the first virtual disk:
         determining one or more second virtual machines or one or more second virtual disks that has a current cache allocation size that exceeds its target size parameter; and
         allocating one or more blocks of cache space from one of the one or more second virtual machines or the one or more second virtual disks to the first virtual machine or the first virtual disk.

16. The method of claim 15 wherein the one or more of second virtual machines or the one or more second virtual disks are ordered according to user-defined weights, and wherein the one or more blocks are allocated from a virtual machine in the one or more second virtual machines or a virtual disk in the one or more second virtual disks having a lowest user-defined weight.

17. A non-transitory computer readable storage medium having stored thereon computer software executable by a processor, the computer software embodying a method for automatically allocating space in a flash storage-based cache, the method comprising:
   collecting an I/O trace log for each virtual machine in a plurality of virtual machines or each virtual disk in a plurality of virtual disks;
   determining a cache utility model for each virtual machine or each virtual disk based on the I/O trace log for the virtual machine or the virtual disk, the cache utility model defining an expected utility of allocating space in the flash storage-based cache to the virtual machine or the virtual disk over a range of different cache allocation sizes, wherein the cache utility model for each virtual machine or each virtual disk includes a spatial locality function and a temporal locality function, the spatial locality function modeling a probability of a cache hit as a function of cache allocation size, the temporal locality function modeling a probability of a cache hit as a function of time, and wherein the spatial locality function and the temporal locality function are generated by:
      reading log entries in the I/O trace log of the virtual machine or the virtual disk, each log entry identifying a logical block address (LBA),
      creating a hashtable based on the log entries, each hashtable entry being keyed by the LBA and including one more log entries from the I/O trace log corresponding to the hashtable entry's LBA key,
      creating, based on the hashtable, an array of spatial distances and an array of temporal distances, each entry in the array of spatial distances identifying a number of I/O operations between consecutive read accesses to a single LBA in the I/O trace log, each entry in the array of temporal distances identifying a time interval between consecutive read accesses to a single LBA in the I/O trace log, and
      applying a linear regression analysis to the array of spatial distances and the array of temporal distances respectively;
   calculating target cache allocation sizes for the plurality of virtual machines or the plurality of virtual disks based on the cache utility models; and
   allocating space in the flash storage-based cache based on the target cache allocation sizes.

18. The non-transitory computer readable storage medium of claim 17 wherein the cache utility model for each virtual machine or each virtual disk takes into account a spatial locality of I/O operations identified in the I/O trace log for the virtual machine or the virtual disk.

19. The non-transitory computer readable storage medium of claim 18 wherein the cache utility model for each virtual machine or each virtual disk further takes into account a temporal locality of I/O operations identified in the I/O trace log for the virtual machine or the virtual disk.

20. The non-transitory computer readable storage medium of claim 19 wherein the temporal locality is based on a user-defined time window.

21. The non-transitory computer readable storage medium of claim 17 wherein the embodied method further comprises collecting I/O statistics for the plurality of virtual machines or the plurality of virtual disks at predefined time intervals, the I/O statistics including I/O operations per second (LOPS) for each virtual machine or each virtual disk, service times of one or more physical storage devices associated with each virtual machine or each virtual disk, and a read/write ratio for each virtual machine or each virtual disk.

22. The non-transitory computer readable storage medium of claim 21 wherein determining a cache utility model for each virtual machine or each virtual disk is further based on the service times and the read/write ratio for the virtual machine or the virtual disk.

23. The non-transitory computer readable storage medium of claim 21 wherein the embodied method further comprises, prior to determining a cache utility model for each virtual machine or each virtual disk:
  detecting that one or more of the I/O statistics have changed beyond a threshold; and
  triggering the determining of a cache utility model for each virtual machine or each virtual disk in response to the detecting.

24. The non-transitory computer readable storage medium of claim 17 wherein the embodied method further comprises, prior to determining a cache utility model for each virtual machine or each virtual disk:
  detecting when a predetermined number of log entries have been collected in the I/O trace log for a virtual machine or a virtual disk; and
  in response to the detecting:
    calculating, based on the log entries, an actual cache hit rate for the virtual machine or the virtual disk;
    calculating, based on a previously determined cache utility model, a predicted cache hit rate for the virtual machine or the virtual disk; and
    if the actual cache hit rate deviates from the predicted cache hit rate beyond a threshold, triggering the determining of cache utility models.

25. The non-transitory computer readable storage medium of claim 17 wherein the embodied method further comprises receiving one or more VM event notifications.

26. The non-transitory computer readable storage medium of claim 25 wherein the one or more VM event notifications include a VM power on/off event notification, a VM suspend/resume event notification, or a VM mobility event notification.

27. The non-transitory computer readable storage medium of claim 26 wherein the embodied method further comprises triggering the determining of a cache utility model for each virtual machine or each virtual disk or the calculating of target cache allocation sizes based on the one or more VM event notifications.

28. The non-transitory computer readable storage medium of claim 17 wherein calculating target cache allocation sizes for the plurality of virtual machines or the plurality of virtual disks comprises:
  defining an objective function based on the cache utility model for each virtual machine or each virtual disk and a user-defined weight assigned to the virtual machine or the virtual disk; and
  optimizing the objective function.

29. The non-transitory computer readable storage medium of claim 28 wherein the objective function is subject to a constraint indicating that a sum of the target cache allocation sizes cannot exceed a size of the flash storage-based cache.

30. The non-transitory computer readable storage medium of claim 29 wherein the objective function is subject to a further constraint indicating that the target cache allocation size for each virtual machine or each virtual disk cannot exceed a maximum user-defined cache allocation size for the virtual machine or the virtual disk and cannot go below a minimum user-defined cache allocation size for the virtual machine or the virtual disk.

31. The non-transitory computer readable storage medium of claim 17 wherein allocating space in the flash-storage based cache based on the target cache allocation sizes comprises:
  modifying, for each virtual machine or each virtual disk, a target size parameter based on the target cache allocation size for the virtual machine or the virtual disk; and
  upon servicing an I/O request directed to a first virtual machine or a first virtual disk:
    determining a current cache allocation size for the first virtual machine or the first virtual disk; and
    if the current cache allocation size is less than the target size parameter for the first virtual machine or the first virtual disk:
      determining one or more second virtual machines or one or more second virtual disks that has a current cache allocation size that exceeds its target size parameter; and
      allocating one or more blocks of cache space from one of the one or more second virtual machines or the one or more second virtual disks to the first virtual machine or the first virtual disk.

32. The non-transitory computer readable storage medium of claim 31 wherein the one or more of second virtual machines or the one or more second virtual disks are ordered according to user-defined weights, and wherein the one or more blocks are allocated from a virtual machine in the one or more second virtual machines or a virtual disk in the one or more second virtual disks having a lowest user-defined weight.

33. A system for automatically allocating space in a flash storage-based cache, the system comprising:
  a processor configured to:
    collect an I/O trace log for each virtual machine in a plurality of virtual machines or each virtual disk in a plurality of virtual disks;
    determine a cache utility model for each virtual machine or each virtual disk based on the I/O trace log for the virtual machine or the virtual disk, the cache utility model defining an expected utility of allocating space in the flash storage-based cache to the virtual machine or the virtual disk over a range of different cache allocation sizes, wherein the cache utility model for each virtual machine or each virtual disk includes a spatial locality function and a temporal locality function, the spatial locality function modeling a probability of a cache hit as a function of cache allocation size, the temporal locality function modeling a probability of a cache hit as a function of time, and wherein the spatial locality function and the temporal locality function are generated by:

reading log entries in the I/O trace log of the virtual machine or the virtual disk, each log entry identifying a logical block address (LBA), creating a hashtable based on the log entries, each hashtable entry being keyed by the LBA and including one more log entries from the I/O trace log corresponding to the hashtable entry's LBA key, creating, based on the hashtable, an array of spatial distances and an array of temporal distances, each entry in the array of spatial distances identifying a number of I/O operations between consecutive read accesses to a single LBA in the I/O trace log, each entry in the array of temporal distances identifying a time interval between consecutive read accesses to a single LBA in the I/O trace log, and applying a linear regression analysis to the array of spatial distances and the array of temporal distances respectively;

calculate target cache allocation sizes for the plurality of virtual machines or the plurality of virtual disks based on the cache utility models; and allocate space in the flash storage-based cache based on the target cache allocation sizes.

34. The system of claim 33, wherein the cache utility model for each virtual machine or each virtual disk takes into account a spatial locality of I/O operations identified in the I/O trace log for the virtual machine or the virtual disk.

35. The system of claim 34 wherein the cache utility model for each virtual machine or each virtual disk further takes into account a temporal locality of I/O operations identified in the I/O trace log for the virtual machine or the virtual disk.

36. The system of claim 35 wherein the temporal locality is based on a user-defined time window.

37. The system of claim 33 wherein the processor is further configured to collect I/O statistics for the plurality of virtual machines or the plurality of virtual disks at predefined time intervals, the I/O statistics including I/O operations per second (LOPS) for each virtual machine or each virtual disk, service times of one or more physical storage devices associated with each virtual machine or each virtual disk, and a read/write ratio for each virtual machine or each virtual disk.

38. The system of claim 37 wherein determining a cache utility model for each virtual machine or each virtual disk is further based on the service times and the read/write ratio for the virtual machine or the virtual disk.

39. The system of claim 37 wherein the processor is further configured to, prior to determining a cache utility model for each virtual machine or each virtual disk:

detect that one or more of the I/O statistics have changed beyond a threshold; and trigger the determining of a cache utility model for each virtual machine or each virtual disk in response to the detecting.

40. The system of claim 33 wherein the processor is further configured to, prior to determining a cache utility model for each virtual machine or each virtual disk:

detect when a predetermined number of log entries have been collected in the I/O trace log for a virtual machine or a virtual disk; and in response to the detecting:

calculate, based on the log entries, an actual cache hit rate for the virtual machine or the virtual disk;

calculate, based on a previously determined cache utility model, a predicted cache hit rate for the virtual machine or the virtual disk; and if the actual cache hit rate deviates from the predicted cache hit rate beyond a threshold, trigger the determining of cache utility models.

41. The system of claim 33 wherein the processor is further configured to receive one or more VM event notifications.

42. The system of claim 41 wherein the one or more VM event notifications include a VM power on/off event notification, a VM suspend/resume event notification, or a VM mobility event notification.

43. The system of claim 42 wherein the processor is further configured to trigger the determining of a cache utility model for each virtual machine or each virtual disk or the calculating of target cache allocation sizes based on the one or more VM event notifications.

44. The system of claim 33 wherein calculating target cache allocation sizes for the plurality of virtual machines or the plurality of virtual disks comprises:

defining an objective function based on the cache utility model for each virtual machine or each virtual disk and a user-defined weight assigned to the virtual machine or the virtual disk; and optimizing the objective function.

45. The system of claim 44 wherein the objective function is subject to a constraint indicating that a sum of the target cache allocation sizes cannot exceed a size of the flash storage-based cache.

46. The system of claim 45 wherein the objective function is subject to a further constraint indicating that the target cache allocation size for each virtual machine or each virtual disk cannot exceed a maximum user-defined cache allocation size for the virtual machine or the virtual disk and cannot go below a minimum user-defined cache allocation size for the virtual machine or the virtual disk.

47. The system of claim 33 wherein allocating space in the flash-storage based cache based on the target cache allocation sizes comprises:

modifying, for each virtual machine or each virtual disk, a target size parameter based on the target cache allocation size for the virtual machine or the virtual disk; and upon servicing an I/O request directed to a first virtual machine or a first virtual disk:

determining a current cache allocation size for the first virtual machine or the first virtual disk; and if the current cache allocation size is less than the target size parameter for the first virtual machine or the first virtual disk:

determining one or more second virtual machines or one or more second virtual disks that has a current cache allocation size that exceeds its target size parameter; and allocating one or more blocks of cache space from one of the one or more second virtual machines or the one or more second virtual disks to the first virtual machine or the first virtual disk.

48. The system of claim 47 wherein the one or more of second virtual machines or the one or more second virtual disks are ordered according to user-defined weights, and wherein the one or more blocks are allocated from a virtual machine in the one or more second virtual machines or a virtual disk in the one or more second virtual disks having a lowest user-defined weight.

* * * * *